A. G. YATES.
SEED BOX.
APPLICATION FILED OCT. 23, 1908.

913,605.

Patented Feb. 23, 1909.
2 SHEETS—SHEET 1.

WITNESSES

INVENTOR
Arthur G. Yates
BY
ATTORNEYS

A. G. YATES.
SEED BOX.
APPLICATION FILED OCT. 23, 1908.
913,605.
Patented Feb. 23, 1909.
2 SHEETS—SHEET 2.
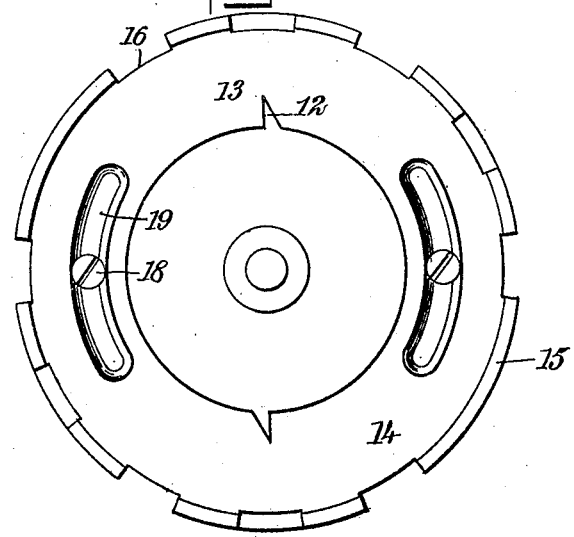
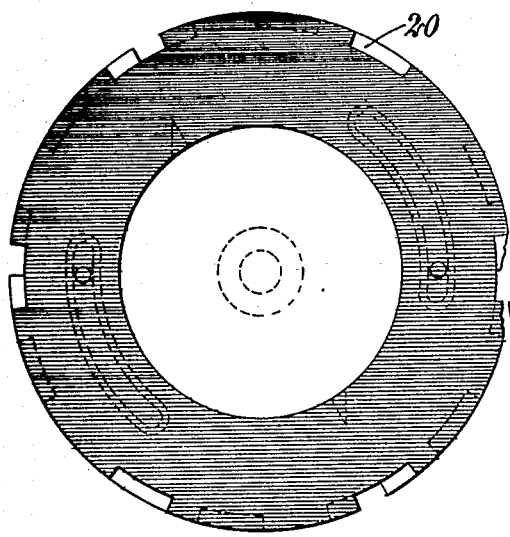
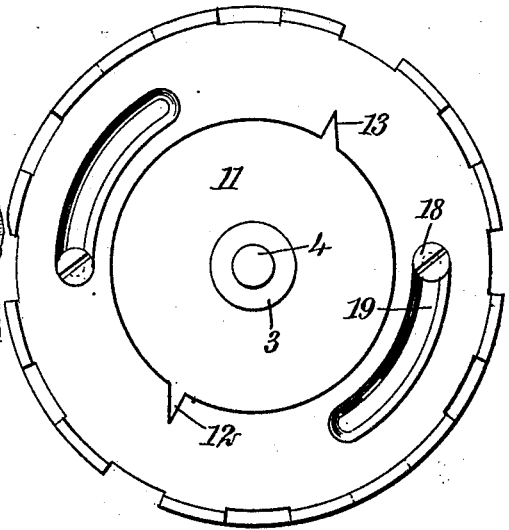
WITNESSES
INVENTOR
Arthur G. Yates
BY
ATTORNEYS

UNITED STATES PATENT OFFICE.

ARTHUR G. YATES, OF FRIEND, NEBRASKA.

SEED-BOX.

No. 913,605.  Specification of Letters Patent.  Patented Feb. 23, 1909.

Application filed October 23, 1908. Serial No. 459,146.

*To all whom it may concern:*

Be it known that I, ARTHUR G. YATES, a citizen of the United States, and a resident of Friend, in the county of Saline and State of Nebraska, have invented a new and Improved Seed-Box, of which the following is a full, clear, and exact description.

This invention relates to seed-boxes such as are used in connection with seed depositing implements.

The object of the invention is to produce a seed-box having means for dropping different numbers of seeds or seeds of different sizes.

The seed-box is particularly applicable to corn planters.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
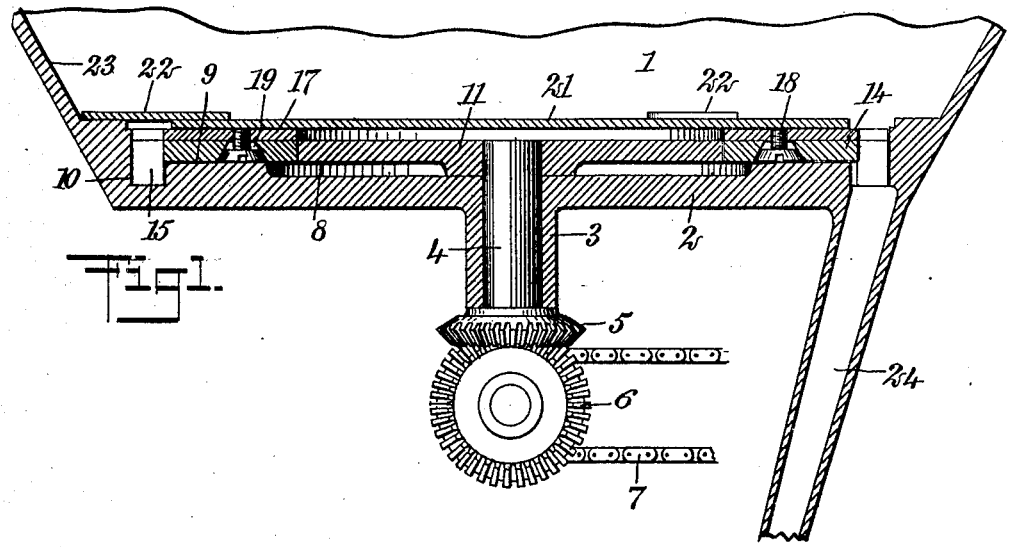
Figure 2:
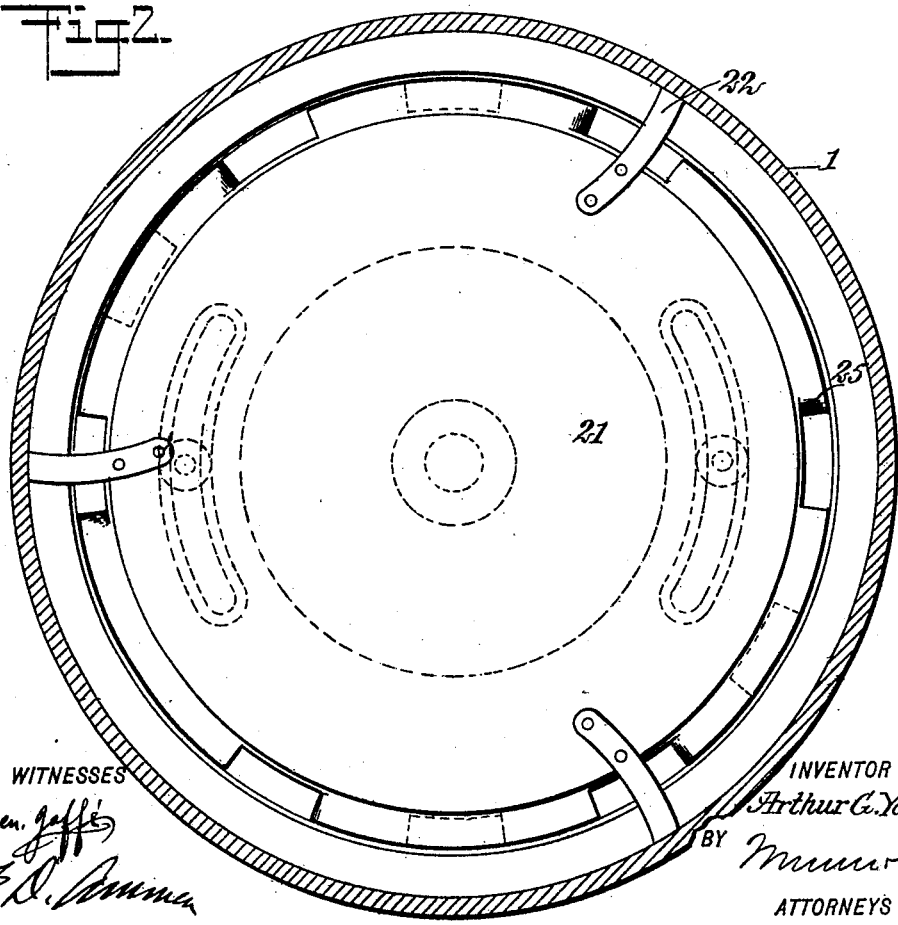

Figure 1 is a vertical cross section through the lower portion of a seed-box constructed according to my invention, this view showing a portion of the drill or seed chute broken away; Fig. 2 is a horizontal section through the seed-box taken just above the bottom thereof; Fig. 3 is a bottom plan of the seed plate and adjusting plate; Fig. 4 is a horizontal section through the adjusting plate and showing the same in a different position on the seed plate; and Fig. 5 is a view similar to Fig. 3, but showing the adjusting plate in a different position.

Referring more particularly to the parts, 1 represents the body of the seed-box, which is in the form of a hopper having a bottom 2 with a central boss 3, in which there is mounted a stub shaft 4. This stub shaft is provided at its lower end with a bevel gear wheel 5 which is adapted to be driven continuously by a corresponding bevel gear wheel 6; this latter gear is driven continuously from some moving part of the machine by a sprocket chain 7.

The middle portion of the bottom plate 2 is formed with a central recess 8 so that an annular seat or wearing face 9 is formed at the bottom of the box. Beyond this wearing face 9, the bottom 2 is provided with an annular seed groove 10. To the stub shaft 4, which projects above the bottom 2, a center plate or center 11 is attached, and this center plate is provided as indicated in Figs. 3 and 5, with diametrically opposite teeth 12 which fit into notches 13 formed in the inner edge of an annular seed plate 14. This seed plate 14 is provided on its under side with a downwardly projecting flange 15, and this flange runs in the seed groove 10, as will be readily understood. In addition to this, the edge of the seed plate is provided with notches 16 of angular form. There are two sets of these notches, which are diametrically opposite to each other and equidistant from each other. As shown in Fig. 3, there are six notches in each of these sets. On the upper side of the seed plate 14 there is provided an adjusting plate 17 which is also of annular form. This adjusting plate is attached to the seed plate by means of set screws 18 which pass upwardly through the seed plate and are countersunk therein, as indicated. These set screws 18 pass through arcuate or curved slots 19 in the seed plate.

The adjusting plate 17 is provided with notches 20 which are equal in size to the notches 16, and are spaced an equal distance apart throughout the circumference of the adjusting plate. Over the adjusting plate 17, a cover plate or disk 21 is provided. This disk is held in a central position by means of finger plates 22 which are three in number, and attached, as shown, near the edge thereof. These plates 22 project across the bottom so that their ends lie adjacent to the inclined side walls 23 of the seed-box. In this way they hold the cover plate in position. It will be observed that the finger plates 22 project across the annular seed groove 10 referred to above.

The notches 16 are only half the distance apart as the notches 20, and from this arrangement it is possible to shift the position of the adjusting plate on the seed plate so that all of the notches will be out of register with each other, or all in register with each other. In the first instance, the dropping of the seed from the seed-box will cease altogether, and in the second case all of the notches will drop seed into the seed groove. Furthermore, it is possible for the notches to be arranged so that some of them overlap or partly obstruct each other, as shown in Fig. 4. In this condition, the area of the notches which pass the seed down, is greatly reduced, and they may be made to pass only one seed or two seeds. The plates may be arranged so that they will pass four seeds at each revolution, or as great a number as eighteen seeds, as each completely open notch will take these seeds. With each revolution of the seed plate, the seeds which fall through the notches into the seed groove, are ejected into the chute or conductor 24 down which the seed passes to the ground.

The edges of the notches 20 in the adjusting plate are preferably beveled as indicated at 25, that is, on the rear edges of the notches with respect to the direction of rotation. This arrangement tends to prevent the clogging of the seeds at the notches.

It will be evident that in connection with the same seed-box, a number of different seed plates and adjusting plates can be used, enabling the seed-box to be used for depositing different kinds of seeds.

Having thus described my invention, I claim as new and desire to secure by Letters Patent,—

1. In a seed-box, in combination, a hopper having a bottom, a seed plate rotatably mounted on said bottom and having a plurality of notches in the edge thereof, an adjusting plate adjustably mounted on said seed plate, and also having notches which may register with said first notches, and means for rotating said seed plate, said bottom having an annular seed groove at the edge of said seed plate and under said notches.

2. A seed-box having a bottom with an annular seed groove therein and a seat encircled by said groove, a seed plate rotatably mounted on said seat and having a member projecting into said groove, said seed plate having notches in the edge thereof disposed over said groove, an adjusting plate attached to said seed plate and also having notches which may register with said first notches, and means for rotating said seed plate.

3. A seed-box having a bottom with an annular seed groove therein, a seed plate rotatably mounted on said bottom having a plurality of notches in the edge thereof in two sets disposed diametrically opposite to each other, the notches of each of said sets being equidistant from each other, an adjusting plate attached to said seed plate and having notches equidistant from each other and spaced twice the distance of the notches in said seed plate, and means for rotating said seed plate.

4. A seed-box having a bottom with an annular seed groove therein, a seed plate having notches in the edge thereof disposed over said groove, and an adjusting plate attached to said seed plate and having notches which may register with said first notches.

5. A seed-box having a bottom with an annular groove therein, a seed plate having notches in the edge thereof disposed over said seed groove, an adjusting plate also having notches which may register with said first notches, a cover plate disposed over said adjusting plate, and finger plates attached to said cover plate and projecting out to the side wall of said seed-box.

In testimony whereof I have signed my name to this specification in the presence of two subscribing witnesses.

ARTHUR G. YATES.

Witnesses:
 HALLIE F. O'NEAL,
 R. M. PROUDFIT.